United States Patent [19]

Russell

[11] 4,321,700
[45] Mar. 23, 1982

[54] OPTICAL TRACK SEGMENT INTERCEPT APPARATUS

[75] Inventor: James T. Russell, Richland, Wash.

[73] Assignee: Digital Recording Corporation, Wilton, Conn.

[21] Appl. No.: 32,367

[22] Filed: Apr. 23, 1979

Related U.S. Application Data

[60] Continuation of Ser. No. 870,642, Jan. 19, 1978, Pat. No. 4,163,600, which is a division of Ser. No. 727,369, Sep. 27, 1976, Pat. No. 4,090,031, which is a continuation of Ser. No. 516,453, Oct. 21, 1974, abandoned.

[51] Int. Cl.$^3$ .................... G11B 7/00; G11B 15/52; G11B 3/74; G02B 27/17
[52] U.S. Cl. ...................... 369/44; 369/47; 369/94; 369/97; 358/128.5; 350/6.7
[58] Field of Search .................... 360/77, 78; 358/127, 358/128, 130–132, 128.5; 179/100.1 G, 100.3 B, 100.3 D, 100.3 M, 100.3 V, 100.4 D; 369/44, 94, 97; 350/6.7

[56] References Cited

U.S. PATENT DOCUMENTS

| | | | |
|---|---|---|---|
| 3,085,230 | 4/1963 | Shoultes et al. | 340/172.5 |
| 3,314,074 | 4/1967 | Becker | 346/108 |
| 3,501,586 | 3/1970 | Russell | 179/100.3 V |
| 3,624,284 | 11/1971 | Russell | 179/100.3 D X |
| 3,823,276 | 7/1974 | Maslowski et al. | 346/108 X |
| 3,919,697 | 11/1975 | Walker | 360/77 X |
| 3,941,927 | 3/1976 | Russell | 340/180 X |
| 4,074,085 | 2/1978 | Russell | 179/100.3 B |
| 4,090,031 | 5/1978 | Russell | 358/130 |
| 4,138,741 | 2/1979 | Hedlund et al. | 360/77 X |
| 4,142,209 | 2/1979 | Hedlund et al. | 360/77 X |

*Primary Examiner*—Aristotelis M. Psitos
*Attorney, Agent, or Firm*—Klarquist, Sparkman, Campbell, Leigh, Whinston & Dellett

[57] ABSTRACT

A track intercept apparatus is described for use in an optical playback machine which plays back data recorded on an optical record in track segments. The apparatus deflects the scanning light beam of such machine so that the light beam intercepts each selected track segment properly when the scan is initiated. A track intercept control circuit is employed having storage means for storage of variable values of track alignment data, adjust means for producing an adjustment signal corresponding to the stored data which is applied to a light beam deflection means, and timing means for controlling gating circuitry and for coordinating events within the circuit with the operation of the playback machine as a whole. One embodiment of the invention includes a circuit which compensates for track-following corrections made during scanning by returning the scanning light beam to a stored starting position. Another embodiment has a circuit for electronically aligning the scanner optics. A third embodiment includes a circuit for using data track addresses to direct the scanning light beam to the correct track. A fourth embodiment has a circuit which combines the first three embodiments.

16 Claims, 5 Drawing Figures

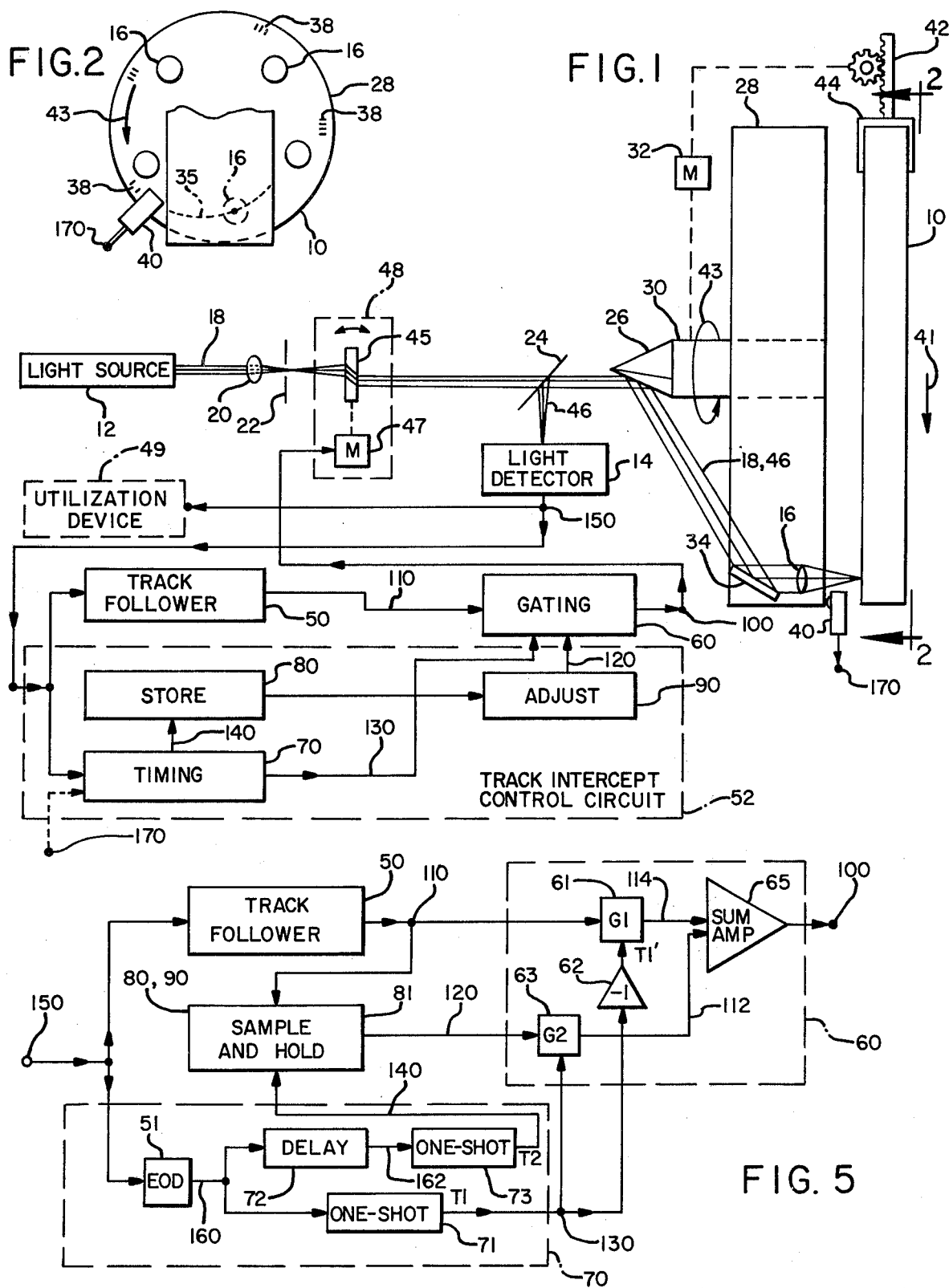

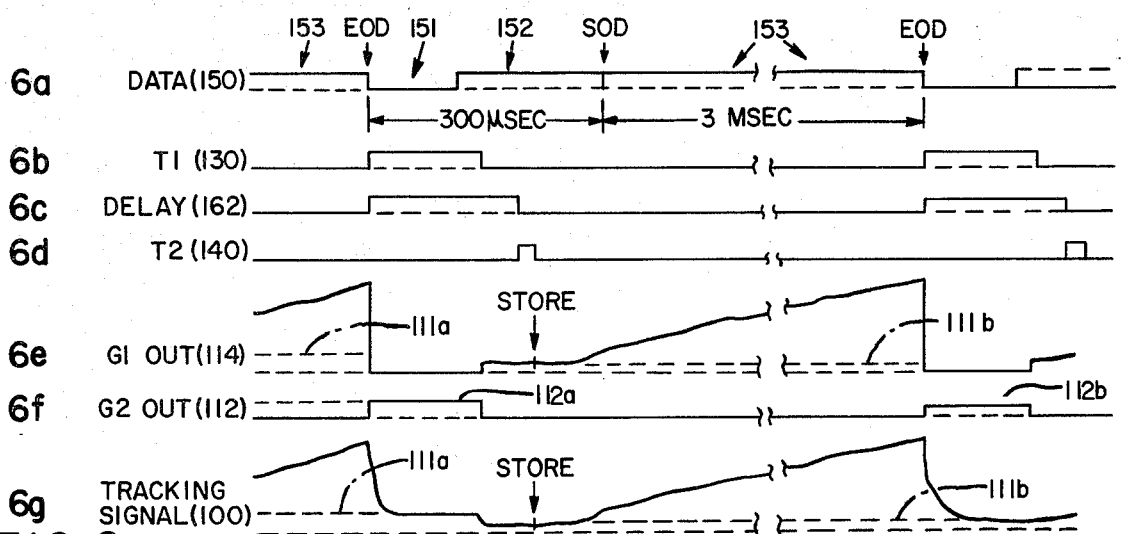
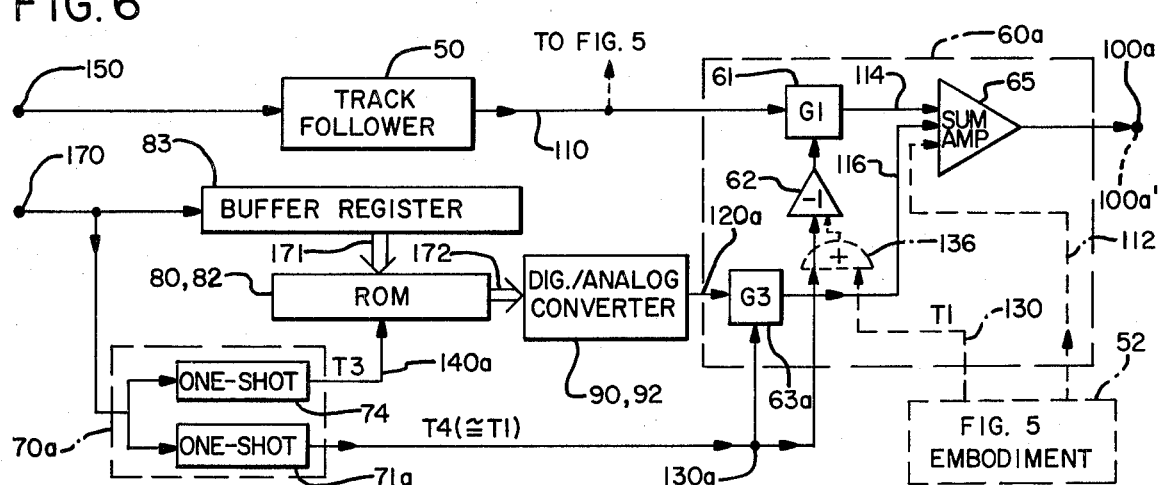
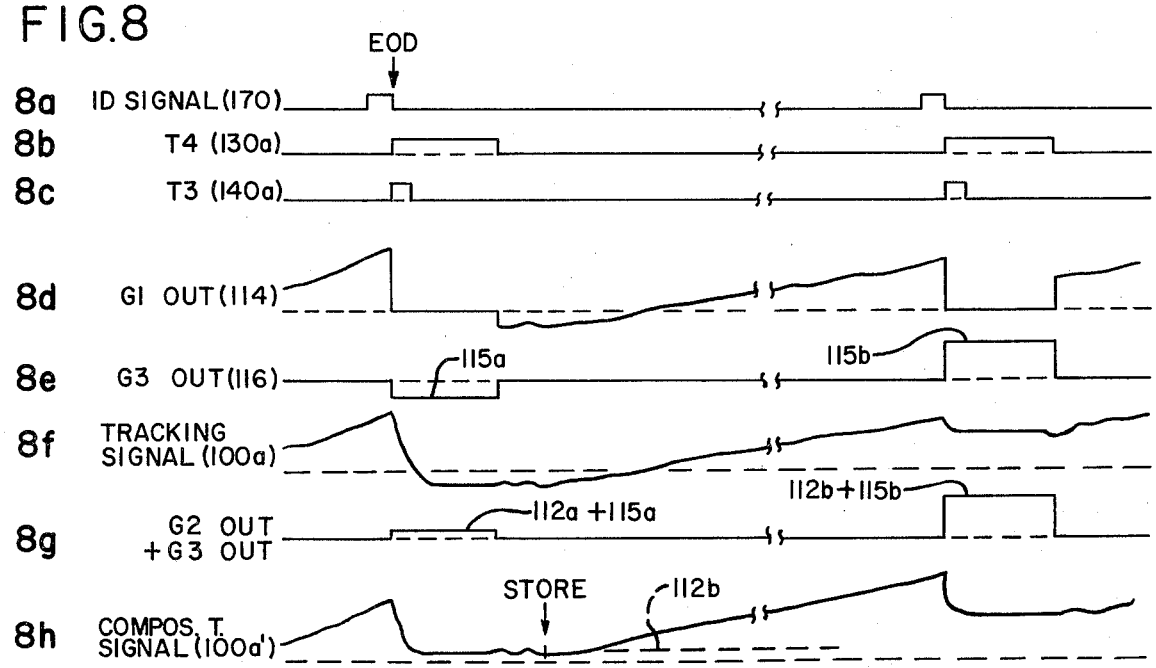

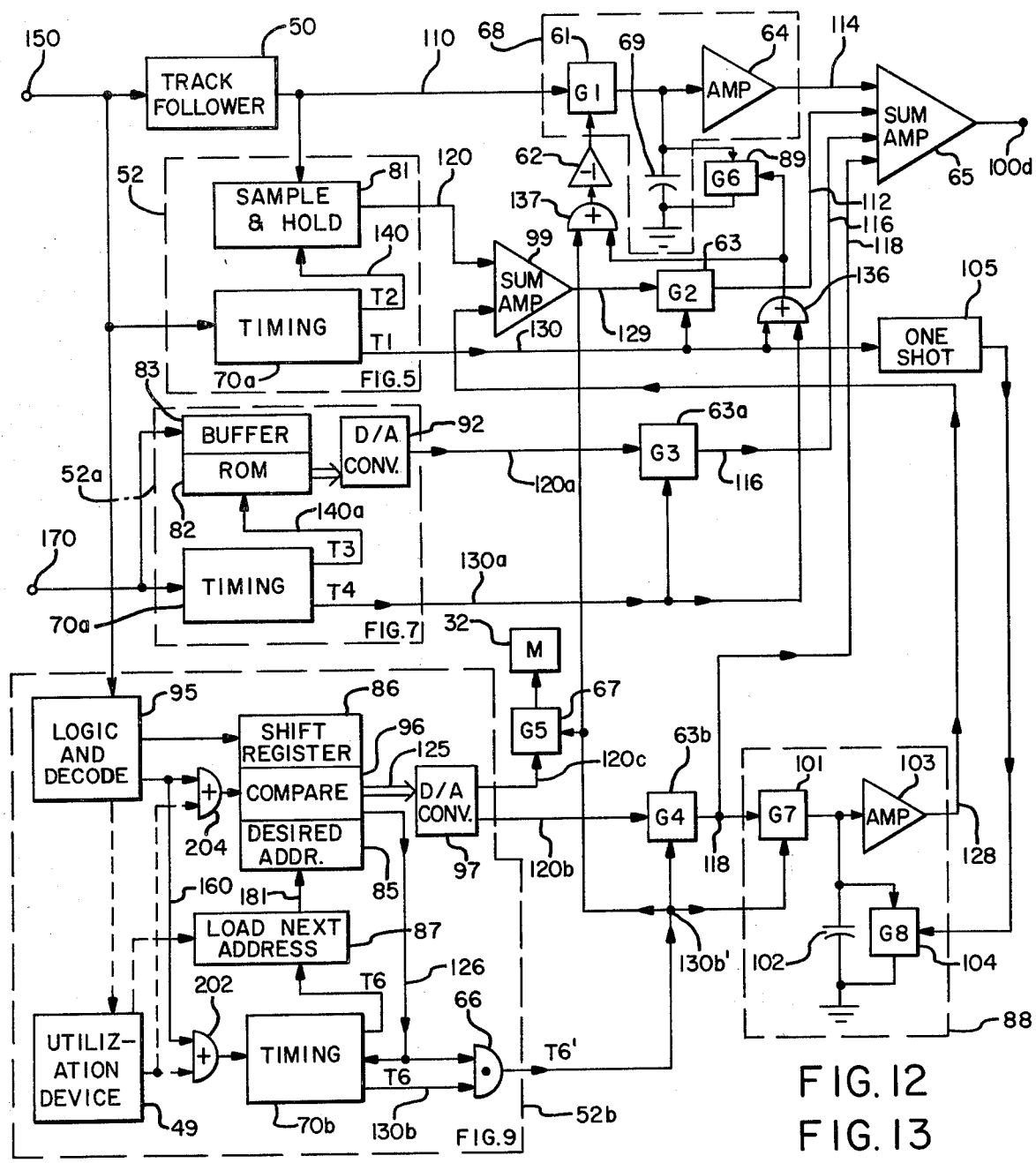
FIG. 12
FIG. 13
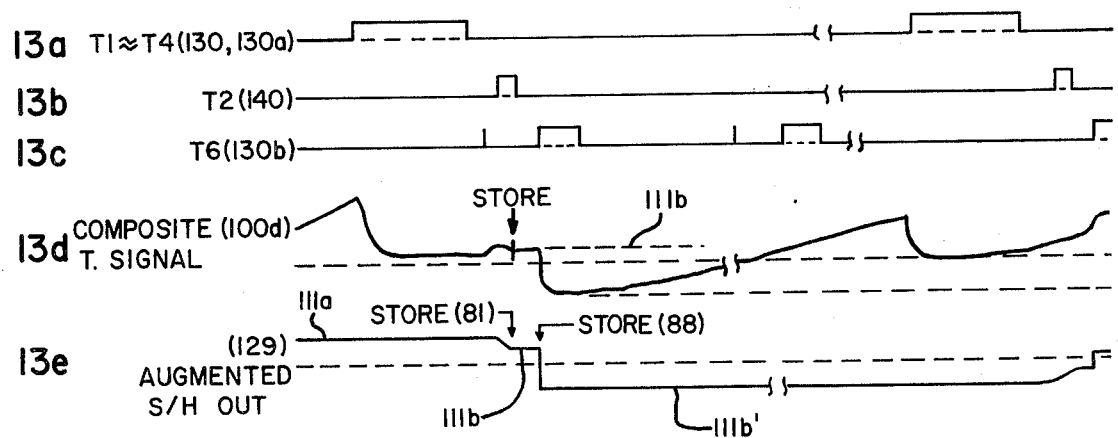

OPTICAL TRACK SEGMENT INTERCEPT APPARATUS

RELATED PATENT APPLICATION

This is a continuation in part of my co-pending application for patent on a Light Beam Scanner, Ser. No. 870,642, now U.S. Pat. No. 4,163,000, filed Jan. 19, 1978, as a divisional of my then copending application Ser. No. 727,369, now U.S. Pat. No. 4,090,031, filed Sept. 27, 1976 as a continuation of my then copending application Ser. No. 516,453, now abandoned, filed Oct. 21, 1974.

BACKGROUND OF THE INVENTION

1. Field of the Invention

The invention relates generally to optical recording and playback systems and more particularly to control circuitry in optical playback machines for deflection of the scanning light beam so that it accurately intercepts and follows the proper selected track segment in an optical record even though the record and the scanner optics are not precisely aligned.

2. Description of the Prior Art

In many optical recording systems, analog or digital data is recorded on an optical record in a data track which is segmented into arcs or raster lines across the record. Such records are illustrated in my co-pending application Ser. No. 556,780 filed and in my U.S. Pat. No. 3,501,586. Such records may be read by a playback machine such as that illustrated in my U.S. Pat. No. 4,090,031, which employs multiple sets of mirror-lens pairs as optical scanning elements to scan a light beam across a record. In each case, a track segment is read by one set of scanning elements and successive track segments are read by different sets of scanning elements as the scanner moves relatively to the record.

In principle, as each set of the scanning elements comes into position to read the next track segment, that segment is properly aligned with the scanning elements. In practice, there can be an error in the alignment of the light beam with the track segment to be scanned due to a tilted record or due to improperly aligned optical elements. In addition, for some purposes it is desirable to provide a random accessing capability for scanning track segments in an order other than that in which they are arranged on a record.

For example, in one kind of optical scanner, there are five sets of scanning elements on a scanning wheel, each set consisting of an objective lens and associated mirror. The sets are sequentially coupled to the light beam source one at a time by a distributor mirror in the form of a five sided polygon. The record may be a 4"×5" plate or card with the record segments in the form of arcs across the width of the record. If the record is tilted slightly, the center of curvature of the arcs will not match that of the scanner. Consequently, the scanning light beam tends to follow a scanning path across the record which crosses the track segment rather than staying on such segment, as shown in FIG. 3.

In order to compensate for such tracking errors, the playback apparatus can include an optical tracker for locking the scanning light beam onto a track segment once the scanning path intersects such a segment. A variety of tracking techniques have been proposed in my U.S. Pat. No. 3,501,586 and No. 3,624,284, my copending application Ser. No. 645,806, filed Dec. 31, 1975, and U.S. Pat. No. 3,919,697 of Walker. However, none of the above references deals with the problem of initially positioning the scanning light beam properly on a track segment preparatory to scanning.

Furthermore, because operation of the optical tracker during the course of scanning a segment skews the scanning light beam from its uncorrected path as it scans the segment, use of such a tracker makes it more difficult to properly intercept the next track segment to be scanned. Referring to FIG. 3 it can be seen that, without an optical tracker, the light beam tends to traverse a scanning path shown in dashed lines which crosses the track segment. The optical tracker insures that once a track segment is crossed, the light beam will tend to follow it. However, in doing so, the tracker causes the light beam to deviate downward from the path it would otherwise follow by an amount Y, measured at the end of the scan. Then, as the next optical element begins scanning the record, its scanning path will be offset downward by the amount Y', thereby causing the scanner to skip the second track segment and incorrectly scan the third track segment. To avoid this problem, the record can be manually positioned to eliminate any error due to tilting, but it would be preferable not to have to make such manual adjustments. Therefore, there remains a need for a correction apparatus capable of operating together with an optical tracker, which will automatically insure that successive scans across an optical record start at the beginning of a correct next selected track segment.

FIG. 4 illustrates the effect of optical misalignment, assuming no record tilt, in a playback unit having four sets of optical elements. In FIG. 4, the first scanning path through the first optical element is properly aligned with a track segment, but the next three scanning paths are either above or below the track segments being scanned due to optical misalignment of successive optical elements. Previously, to avoid this problem, the optical axis of each objective lens was painstakingly adjusted to within 0.25 micron of a reference axis during assembly of the scanner portion of the playback device. It would be preferable to avoid having to manually adjust the alignment of each optical element to such close tolerances. Therefore, a need exists for alignment means in the playback unit for automatically adjusting the scanning light beam relative to the optical element to align it with each track segment as each optical element begins to scan such segment.

For some purposes, it is necessary to insure that the playback unit is scanning a particular identifiable track segment. Specifically, it would be desirable to identify a track segment that is being scanned and determine whether that segment is the correct track segment. If it is not the correct track segment, the playback device would be caused to reposition the scanning light beam to scan the correct track segment. Similarly, it would be desirable to be able to randomly access an identified track segment and to be able to move the scanning light beam which is presently scanning a first track segment the proper distance for intercepting a selected second track segment on the next scan.

Shoultes et al, U.S. Pat. No. 3,085,230, discloses the use of track addresses as a positive means of assuring that a read/write transducer is positioned on a desired track in a rotating magnetic disc record having a plurality of tracks with individual addresses. Shoultes employs digital addressing logic to operate a servo mechanism which moves the readwrite transducer to a radial position on the disc corresponding to a selected address. Each track has a gap followed by its address so that, as the disc rotates, the gap is detected. Detecting a gap triggers reading of the address and comparison with the selected stored address to produce an error signal. If there is no error, data is read from or written upon the track. If there is an error, the error signal triggers creation of a fictitious address which controls the servo mechanism in repositioning the transducer onto the correct track.

The Shoultes patent does not teach how track addressing could be employed in an optical playback system wherein the light detector (transducer) is stationary, while the scanner rotates, rather than the record which, instead, moves along a line transverse to the scanning path and data tracks. Nor does Shoultes teach a way to coordinate such track addressing functions with those of a track-follower designed to maintain registration of a track, while it is being scanned, with the detector. Thus, a need remains for a track intercept means whereby optical track segments can be identified and a scanning light beam directed to a selected track segment.

SUMMARY OF THE INVENTION

It is therefore an object of the present invention to provide an improved optical playback apparatus in which a scanning light beam is positioned to properly intercept a selected track segment in an optical record preparatory for scanning such track segment.

Another object of the present invention is to provide such a playback apparatus with means for automatically correcting for errors in record alignment.

Where track following means are employed in the playback apparatus to cause the scanning light beam to follow a track segment, it is an object of the present invention to compensate for corrections made by the track follower so that the light beam more accurately intercepts a later track segment.

A further object of the invention is to automatically adjust the light beam relative to optical elements of an optical scanner to align such beam with each element and thereby avoid the necessity for manually aligning such elements to high tolerances.

An additional object of the invention is to identify optical track segments to insure that a proper segment is being scanned and to correct the scanning path if necessary.

A related object is to provide means for addressing selected optical track segments and for randomly accessing their contents.

Still another object of the invention is to keep the scanning light beam on track while a first track segment is being scanned and to reposition the beam to intercept a selected second segment during the time interval between scans.

A further object of the invention is to combine the light-beam-to-optical-element alignment, the record alignment and the addressing features of the invention with track following means so that a single adjustment signal is produced and fed to deflection means for deflecting the scanning light beam.

The foregoing and other objects, advantages and features of the present invention will be apparent from the following detailed description of the preferred embodiments.

BRIEF DESCRIPTION OF THE DRAWINGS

FIG. 1 is a side elevational view of an optical record playback apparatus and a block diagram of a light beam deflection control circuit according to the present invention.

FIG. 2 is an end elevational view of the scanner and record of FIG. 1 taken along line 2—2.

FIGS. 5, 7 and 9 are detailed block diagrams of the circuits of three different embodiments of the beam deflector control circuitry of FIG. 1.

FIGS. 6 and 8 are wave form diagrams showing the operation of the circuits of FIGS. 5 and 7, respectively.

FIG. 12 is a block diagram of a fourth embodiment of the circuit of FIG. 1, showing the embodiments of FIGS. 5, 7 and 9 in combination.

FIG. 13 is a wave form diagram showing the operation of the circuit of FIG. 12.

DESCRIPTION OF THE PREFERRED EMBODIMENTS

General Description

Figure 3:
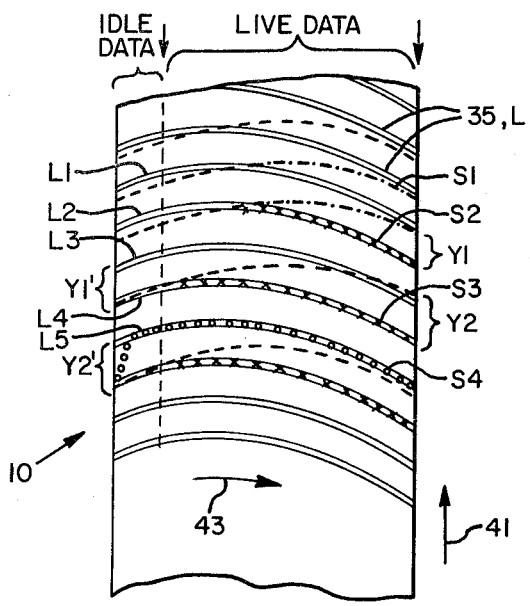
FIGS. 3 and 4 are enlarged plan views of an optical data record showing scanning paths traced by the scanning light beam with the record tilted in FIG. 3 and the scanner optical elements misaligned in FIG. 4, and with the track lines exaggerated for clarity.

Referring to FIG. 1, an optical data record 10 of the reflective type is played back with a playback apparatus having a light source 12 and a light detector 14 positioned on the same side of the record. During playback light is transmitted to and reflected away from such record through objective lenses 16. Alternatively, a light transmissive type record may be used which is played back with a playback apparatus such as is described in my U.S. Pat. No. 4,090,031, wherein the light source and detector are on opposite sides of the record.

The light source 12 may be a laser which produces "coherent" light of one or more narrow frequency bands, or a suitable source of intense noncoherent "white" light of many frequencies, including ultraviolet light, infrared light, as well as visible light. A light beam 18 is transmitted from source 12 through a primary lens 20 and an apertured light mask commonly referred to as a "pin hole" element 22. Lens 20 focuses the light beam to a small spot at the circular aperture of the pin hole element so that such aperture shapes the light spot and forms the object that is imaged onto the record by the objective lenses 16. The light beam 18 is transmitted through a beam splitting mirror 24 onto a rotating distributor mirror member 26 whose outer surface is in the form of a fivesided polygon having five mirrors provided thereon which correspond to five objective lenses 16 which are carried on a rotating scanner wheel 28. The distributor mirror member 26 is mounted on the shaft 30 of the scanner wheel 28 so that it is rotated with such wheel at a constant speed by an electrical motor means 32 coupled thereto. As a result, the distributor mirror member 26 rotates at the same speed as the objective lenses 16 so that one of the mirrors of such distributor member is always aligned with its associated objective lens. Thus, the distributor mirror member 26 distributes the light beam 18 to the objective lenses 16 one at a time as such lenses rotate across the record 10 to playback one of the data track segments 35 on such record, as shown in FIG. 2.

The light beam 18 is reflected from one of the distributor mirrors onto one of five objective mirrors 34 mounted on the scanner wheel 28 immediately adjacent each objective lens 16. As a result, the light beam is reflected from the objective mirror 34 through its associated objective lens 16 onto the optical data record 10. The light beam is focused by lenses 20 and 16 to a small spot in a focus plane on the record, such spot being of a diameter which is approximately the same size as the width of one of the data track lines 35 provided on such record.

The light spot focused on the record is scanned along one line 35 of the data track without overlapping adjacent track lines. This scanning in a longitudinal or "X" direction along the track lines is accomplished by rotation of the scanner wheel 28 in the direction of arrow 43 at a speed of about 3600 RPM for a 3.4 inches radius of the wheel to the center of the objective lenses. To scan sequentially from line to line in the transverse or "Y" direction, the data record 10 is moved slowly downward in the direction of arrow 41 in any suitable manner, such as by a rack and pinion or worm gear apparatus 42 which moves a carriage 44 supporting the record and is suitably geared to the motor means 32. The speed of longitudinal movement of the record 10 is about 600 microns per second for playing back a television signal on a record 4 inches wide. As a result, each objective lens 16 scans a separate data track line 35 as the scanner wheel 28 is rotated in the direction of arrow 43.

When the playback apparatus is employed as a peripheral memory unit in a computer system, motor means 32 can include a second motor (not shown). One motor rotates the scanner 28 and the other motor moves the carriage 44 either up or down to roughly position record 10 for reading of data.

The scanning light beam 18 is reflected back from the data spots as a modulated readout light beam 46 passing through the objective lens 16 to the objective mirror 34 and distributor mirror 26 to the beam splitter mirror 24. The beam splitter mirror reflects the modulated readout light beam 46 to the detector 14, which is a photoelectric cell that produces an electrical data output signal 150 corresponding to to the modulation of the light beam (FIGS. 6a, 10a). Data signal 150 is transmitted to the video input of the television receiver or other utilization device 49 connected to the detector output through a suitable amplifier and decoder system (not shown).

A "tipping" plate 45 for angularly deflecting the light beam 18 by refraction of such beam is provided between the pin hole mask 22 and the beam splitter mirror 24. The tipping plate is pivoted by a galvonometer-type motor 47 in response to a tracking signal applied to its input for changing the magnitude and direction of the vertical deflection of the light beam 18. Thus tipping plate 45 and motor 47 form a light beam deflector 48. Other beam deflectors 48 can be used as well, including the optical fiber deflection device described in my patent, U.S. Pat. No. 3,941,927.

A tracking signal 100 is applied to the input of the beam deflector 48. It consists of two parts corresponding to different time intervals during each scan cycle. The first part is a track-following signal on output 110 produced by track follower 50 to cause the light beam 18 to stay on the data track being scanned. Track follower 50 is a servo system whose input is signal 150 from detector 14. Examples of track followers are shown in U.S. Pat. No. 3,919,697 by R. A. Walker or in my co-pending U.S. patent application, Ser. No. 645,806, filed Dec. 31, 1975.

The second part of the tracking signal is an adjustment signal 120 produced by an adjust circuit 90 in the track intercept control circuit 52 to deflect the light beam up or down to initially intercept a selected data track segment or line 35 preparatory to scanning.

The track-following signal 110 and the adjustment signal 120 are connected as inputs into a gating circuit 60, whose output is the tracking signal 100 applied to beam deflector 48. The gating circuit 60 responds to timing signals on output 130 from timing circuit 70 in the control circuit 52. The gating circuit gates adjust signal 120 to the output 100 during the brief interval (approximately 300 microseconds) between successive scans, and causes the track-following signal 110 to be gated to the output 100 during each scan (3 milliseconds).

The control circuit 52 also includes storage means 80 for storing information which is used by the adjust means 90 in producing the adjust signal. Operation of the storage circuit 80 is controlled by another timing signal on output 140 from the timing circuit 70. The timing circuit 70 includes time delay and one shot (monostable multivibrator) circuits of known design. The timing sequence is triggered either by an end-of-data signal (EOD) produced by an end-of-data detector 51 (FIG. 5), whose input is the output 150 of the light detector 14, by a computer-generated request signal 180 (FIG. 9), or by identification signal 170 from second detector unit 40 (FIGS. 1, 7 and 8). A more particularized discussion of the function of the storage and adjust circuits and their respective timing and gating circuits follows with reference to the specific embodiments, and to the wave form diagrams of FIGS. 6, 8, 10 and 13. For easy comparison, all wave form diagrams employ the same time base.

In each embodiment the storage means stores information corresponding to an amount by which the scanning light beam must be deflected, transversely of the scanning path which it would otherwise follow, to position the beam at an intercept position on a selected track segment preparatory to scanning such segment. Several independent variables can affect the vertical positioning of the light beam. Therefore, the storage and adjust means can assume different forms so that different kinds of information corresponding to such variables can be employed to produce an adjustment signal to the beam deflector for accurately directing the scanning light beam to a selected track.

FIG. 3 shows a record 10 with various scanning paths S traced upon it when the record is tilted from its ideal position. Ideally a scanning path S follows a track segment L along its entire length. When the record is tilted slightly, however, the axes of the arcs described by the track segments or lines L (shown as pairs of solid lines) and scanning paths S (broken line) do not coincide. Thus, path S1 starts below track line L1 and, proceeding in the "X" or scanning direction (arrow 43) across record 10, crosses track line L1 and terminates above such track line. When this happens data is reliably detected in each track segment L only in the region near where the scanning path S crosses the segment.

Adding the track follower 50 in FIG. 1 partially corrects the above-described problem since it causes the light beam to "lock on" to whichever track it crosses, an illustrated by scanning path S2. Thus the portion of path S2 depicted as a line of Xs has locked onto track segment L2. However, data can be missed before the light beam locks onto a track, or the beam may lock onto an incorrect adjacent track.

In addition, use of track follower 50 alone makes it more difficult to accurately position the light beam to scan successive track segments. For example, as the light beam begins scan S2, it is slightly below track L2. When the beam gets close enough to track L2 the track follower 50 locks the beam onto the track. Continuing along the track L2, the beam is gradually deflected downward until terminating at a distance Y1 from its normal path (dotted line) to its locked on path (Xed line) following the track. Then, when scan S3 begins, the light beam locks onto track line L4, having skipped line L3 completely. This happens because the light beam is initially moved down in the "Y" direction by an amount equal to the track spacing plus a distance Y1' equal to the deflection distance Y1. The FIG. 5 embodiment of the present invention, hereinafter described in detail, is designed to correct the above problems. In addition, the FIG. 9 embodiment offers a means for identifying which track segment is being scanned to further assure that the correct segment is being examined.

Figure 4:
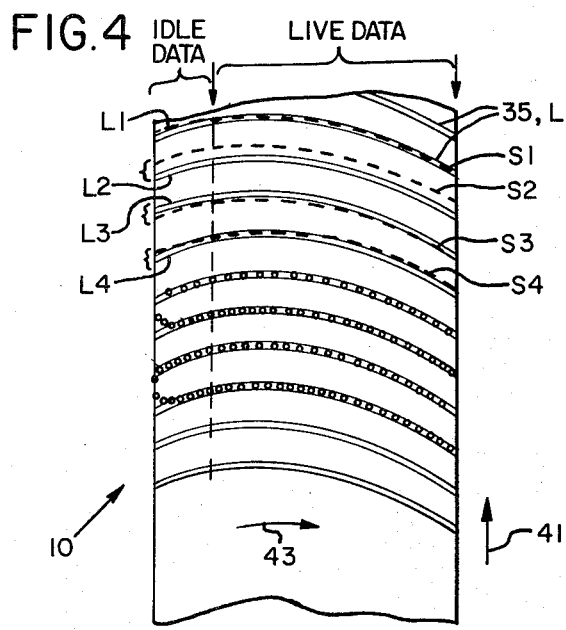
Figure 4A:
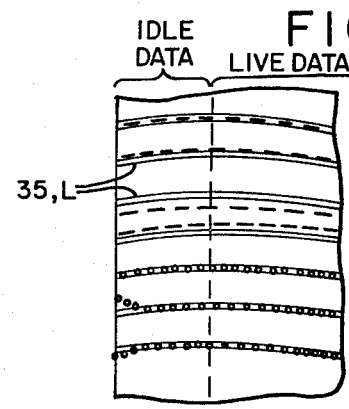

FIG. 4 shows a record 10 with scanning paths when the optical scanning elements are misaligned. Ideally each scan will be a fixed distance below the previous scan because of the constant progression of the record in the "Y" direction in sequential scanning, so that each scan coincides with a track segment. If the optical elements 16, 34 are imprecisely aligned, however, some of the scanning paths will be offset laterally from the track segments L. Thus, in FIG. 4 scanning path S1, generated by a first set of optical elements, is shown aligned with segment L1, but subsequent paths S2, S3, and S4 (in a four-element scanner) are displaced above or below segments L2, L3, and L4, respectively. The FIG. 7 embodiment of the present invention, hereinafter described, is designed to correct the above problem.

FIG. 5 Embodiment

Figure 3A:
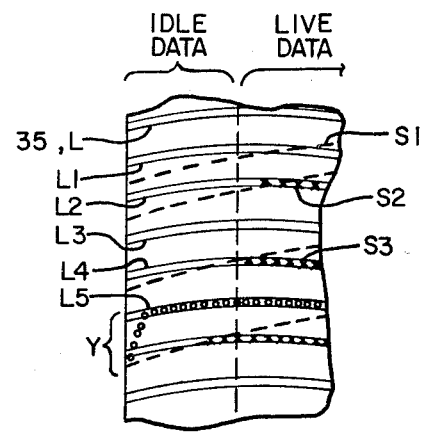
FIGS. 3A and 4A are further enlarged partial plan views of the records of FIGS. 3 and 4, respectively.

The purpose of the FIG. 5 embodiment is to compensate for deflection of the scanning light beam 18 by the track follower 50. It does so by storing a value 111a,b (FIG. 6e) of the track follower output signal 110 (shown at output signal 114 from first gate 61) near the beginning of a first scan S3 of line L4 in FIG. 3, and slewing the deflector 48 an amount Y2' back up to a position corresponding to that value when the first scan is completed. In sequential playback operation, the record 10 moves downward in the "Y" direction by an amount during one scan approximately equal to the sum of the width of one track line and the width of track separation. Therefore, slewing the deflector 48 back to a position corresponding to the stored value 111a,b causes the light beam to intercept the next track line L5 early in the second scan S4 despite misalignment of the record 10 with the scanner, shown in FIGS. 3 and 3A by the line of circles. In FIG. 5, a sample and hold circuit 81 provides both the storage means 80 and adjust means 90 for performing the above-described functions.

Referring to FIG. 6, while a track segment is being scanned, the light detector produces a data signal at output 150 as shown in FIG. 6a. It should be noted that each circuit terminal and the signal appearing on such terminal are given the same reference number for clarity. Thus data signal 150 of FIG. 6a is produced on output terminal 150 of the light detector 14 in FIGS. 1 and 5. The data signal is applied to the input of the track follower 50 which produces a track-follower signal on output 110 as discussed earlier. When a first gate 61 is in a conductive state (ON), it transmits the track-follower signal 114 to summing amplifier 65, as shown in FIG. 6e.

At the end of each scan is a short blank interval 151 in FIG. 6a during which no data is modulated onto the light beam. Such interval is detected by the end-of-data detector 51 in timing circuit 70 to produce an end-of-data signal (EOD) on its output 160. The EOD signal triggers one-shot multivibrator 71 and delayed one-shot 73 to produce timing signals T1 and T2 at outputs 130 and 140, respectively. The effect of each timing signal is considered in turn as follows.

Signal T1 (FIG. 6b) is inverted by inverter 62 to produce signal T1' which switches first gate 61 OFF, blocking transmission of the track-following signal 110 through summing amplifier 65 to beam deflector 48. Essentially simultaneously, signal T1 switches a second gate 63 ON, gating the previously stored adjust signal level 111a from the sample and hold circuit 81 through amplifier 65 to the deflector 48. Examples of the output of gate 63 is shown as signal 112a in FIG. 6f. This switching operation causes the deflector 48 to be slewed from its position at the end of the first scan line to a new position which corresponds to the stored signal 111a preparatory to scanning the succeeding track segment.

When signal T1 returns to a low state, the first gate switches ON and the second gate switches OFF so that the deflector 48 once more receives the output 110 of the track follower 50. The summing amplifier 65 adds the gate outputs 112 and 114 (FIGS. 6e, 6f) to produce the composite tracking signal 100 (FIG. 6g) to the deflector 48.

During the switching caused by timing signal T1 the next optical element 16, 34 of the scanner 28 causes the light beam to scan the next track segment. When the light beam reaches the first edge of the record 10 (FIGS. 3, 4), it first encounters "leader" data 152, shown in FIG. 6a, which can include idle data patterns or address data, so that the track follower 50 can lock onto the track and stabilize before "live" data 153 begins. Live data begins at the start-of-data position on the track line indicated by the SOD symbol.

Turning now to timing signal T2, the EOD signal on output 160 triggers delay 72 to produce a delay signal 162 (FIG. 6c), which in turn triggers one-shot 73 whose output 140 carries timing signal T2. Signal T2 acts as a sampling pulse which switches on a sampling gate in sampling circuit 81 for the width of such pulse and causes it to sample the output signal 110 of the track-follower 50. Delay circuit 72 produces a sufficient time delay for the track-follower to stabilize on the leader portion 152 of the data signal 100 before sampling its output 110. When signal T2 switches OFF the sampling circuit 81 stores the then present value 111b of the track-follower signal as a D.C. sample voltage at output 120. The sample voltage is later gated through date G2 to provide an adjust signal 112b of FIG. 6f by the next timing pulse T1 after the completion of the present scan.

The adjust signal 112 is transmitted through summing amplifier 65 and causes the deflector 45 to return to the position it was in at the moment the sampled value 111b was stored by circuit 81, as described above. An example of a suitable sample and hold circuit 81 is described in detail in connection with the FIG. 12 Embodiment, below.

FIG. 7 Embodiment

The purpose of the FIG. 7 embodiment is to compensate for optical misalignment of the lens-mirror pairs 16, 34 in the scanner 28 by storing a unique deflection value 115 (FIG. 8e) for each pair of optical elements 16, 34 and deflecting the light beam 18 in the "Y" direction in accordance with that stored value, instead of manually aligning the optics to very close tolerances.

Referring to FIG. 7, storage means 80 includes a read-only memory (ROM) 82. ROM 82 is programmed with digital correction values corresponding to the misalignment of each pair of optical elements 16, 34 in the associated scanner. Obviously the ROM would have to be reprogrammed whenever the optical alignment is changed. Each value has a unique location addressable by the buffer register 83.

Referring to FIG. 2, the scanner 28 has sets of marks 38 inward of the circumference of the scanning wheel 28 and slightly ahead of each pair of optical elements 16, 34 in the direction of rotation 43. Each set of marks 38 is unique, thereby identifying its associated pair of optical elements 16, 34. As the wheel rotates, second detector unit 40 including a photocell and associated light source detects each set of marks 38 before its associated pair of elements 16, 34 begins to scan the record 10, thereby producing an identification signal 170 to the buffer register 83, which converts signal 170 to a digital address signal on output 171. Signal 170 also triggers one-shots 71a and 74 to produce timing signals T4 and T3 (FIGS. 8b, 8c) at outputs 130a and 140a, respectively.

Signal T3 causes the ROM 82 to load the optical element address on output 171 from the buffer register 83 for accessing the addressed memory location in such ROM. The digital signal in that location is then read into adjust means 90 in the form of a digital-to-analog converter 92 via ROM output 172. Converter 92 then produces a corresponding analog adjustment signal whose magnitude 115 (FIG. 8e) is proportional to the transverse misalignment of the light beam through its associated pair of optical elements 16, 34, relative to a reference position. Signal T4 is inverted by inverter 62 and causes first gate 61 to switch OFF and third gate 63a to switch ON enabling the converter output signal 120a to flow through gate 63a as gate output signal 116 and through summing amplifier 65 to the deflector 48. Output 116 from gate 63a is shown in FIG. 8e. Deflector 48, in turn, moves the light beam in the "Y" direction a corresponding amount to compensate for optical misalignment of the beam through the next pair of optical elements 16, 34. FIG. 8f shows the tracking signal on output 100b to the deflector from the FIG. 7 Embodiment.

FIG. 7 also shows, in phantom lines, the connection of the FIG. 5 Embodiment of the control circuit 52 to the FIG. 7 Embodiment of such circuit through OR gate 136 to inverter 62 and through summing amplifier 65 to output 100a so that both embodiments can be used together to simultaneously correct for errors due to both record misalignment and optical element misalignment. FIG. 8g shows the algebraic sum of the outputs of the second gate (FIG. 6f) and third gate (FIG. 8e). FIG. 8h shows the composite tracking signal 100a' applied to the deflector 48 when the FIG. 5 and FIG. 7 Embodiments are used together. It should be noted that timing signal T4 ideally coincides with signal T1 even though signal T4 is triggered by detection of marks 38 and signal T1 is triggered by the end-of-data (EOD). This approach requires fine tuning, when the FIG. 5 and FIG. 7 Embodiments are combined, to obtain close coincidence between signals T1 and T4. However, such tuning and the OR gate 136 can be avoided by eliminating one-shot 71a (FIG. 7) and substituting the output of one-shot 71 (FIG. 5) instead, so that signal T1 also serves as signal T4 when the FIG. 5 and FIG. 7 Embodiments are combined.

The digital correction values which are used to produce adjust signal levels 115a,b are generated and permanently stored in ROM 82 after the scanner 28 is assembled and the alignments of the pairs of optical elements 16, 34 are tested. Thus, scanner 28 is operated in a test machine, not part of the present invention, which measures the amount of misalignment of the scanning light beam relative to a reference position for each set of optical elements 16, 34 and computes an analog deflection value 115 for each set. The reference position can be chosen arbitrarily, but preferably intersects the line the light beam would follow if all optical elements could be perfectly aligned. Such values are converted into suitably formatted digital correction values which are then programmed into the ROM, each value being placed in a memory location having an address which matches with marks 38 of its corresponding set of optical elements 16, 34. Programming is accomplished using well-known digital computer programming techniques together with a commercially available ROM programming machine which is adapted to the type of ROM being used.

FIG. 9 Embodiment

Figure 9:
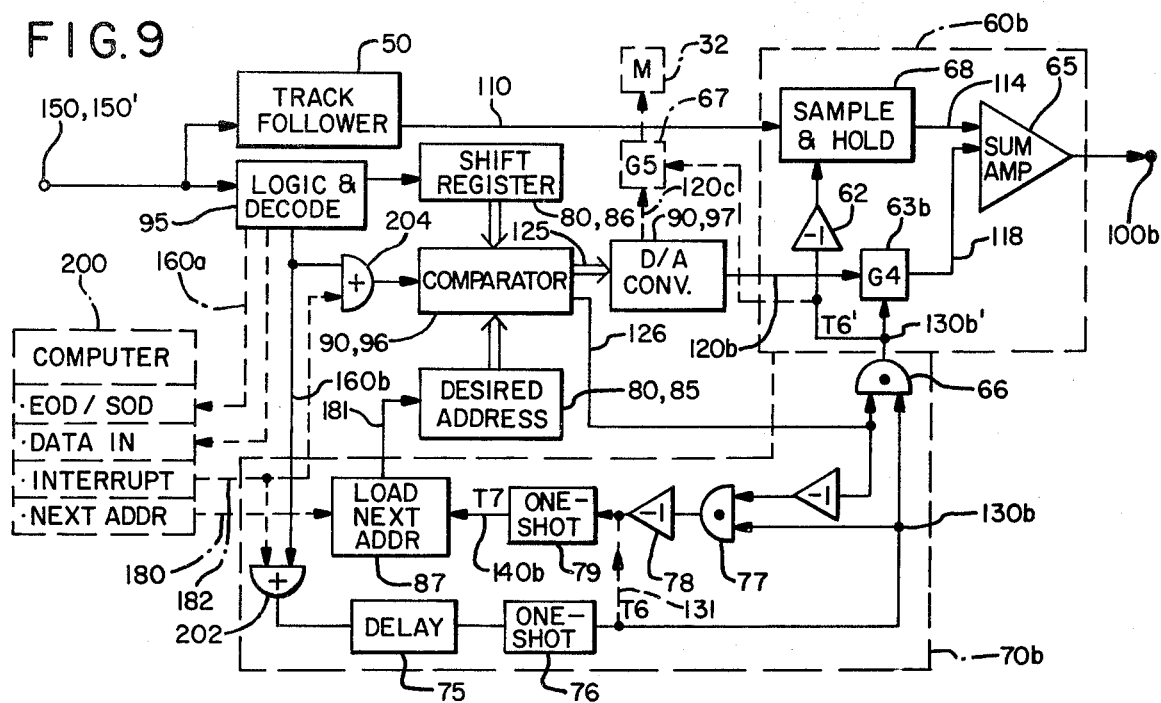

The beam deflector control circuit of the FIG. 9 embodiment performs several functions. It checks whether the correct track segment is being scanned and deflects the light beam to the correct segment while scanning, if the first segment is incorrect. It also scans track segments in other than a sequential mode. The circuit can be used to achieve either or both functions simply by changing the timing of certain operations, as described below. Two versions of the FIG. 9 Embodiment are described: the first version being adapted to the non-sequential or random access mode, and the second version being adapted to the sequential scanning mode.

In general, while operating in the random access mode the FIG. 9 Embodiment performs two kinds of operations. First, while the light beam is scanning a track segment the circuit decodes address information in the track and compares it with the address of the desired track segment. If the addresses differ the device deflects the light beam up or down in the "Y" direction to the desired track segment. Second, while the beam is scanning a segment for which it has previously checked the address, the circuit can accept a request, e.g. from a computer 200, to shift the beam to a new track segment having a different desired address and, comparing the two addresses, deflect the beam to the new segment.

In the sequential mode, such as is used for television, the circuit is only used for address error correction.

Thus, at the beginning of each track segment, an address is detected and compared with an internally generated address which is incremented before scanning the next segment.

1. Random Access Mode

In the circuit of FIG. 9, the storage means 80 of FIG. 1 includes shift registers 85 and 86 for storing a desired digital address and the address of the most-recently-scanned track segment, respectively. The adjust means 90 includes a parallel comparator 96 and a digital-to-analog converter 97. A logic and decode circuit 95 is also provided which has as its input the output signal 150 of detector 14. Circuit 95 converts analog signal 150 into a digital bit stream, recognizing addresses in the bit stream and outputting such addresses to shift register 86.

Figure 10:
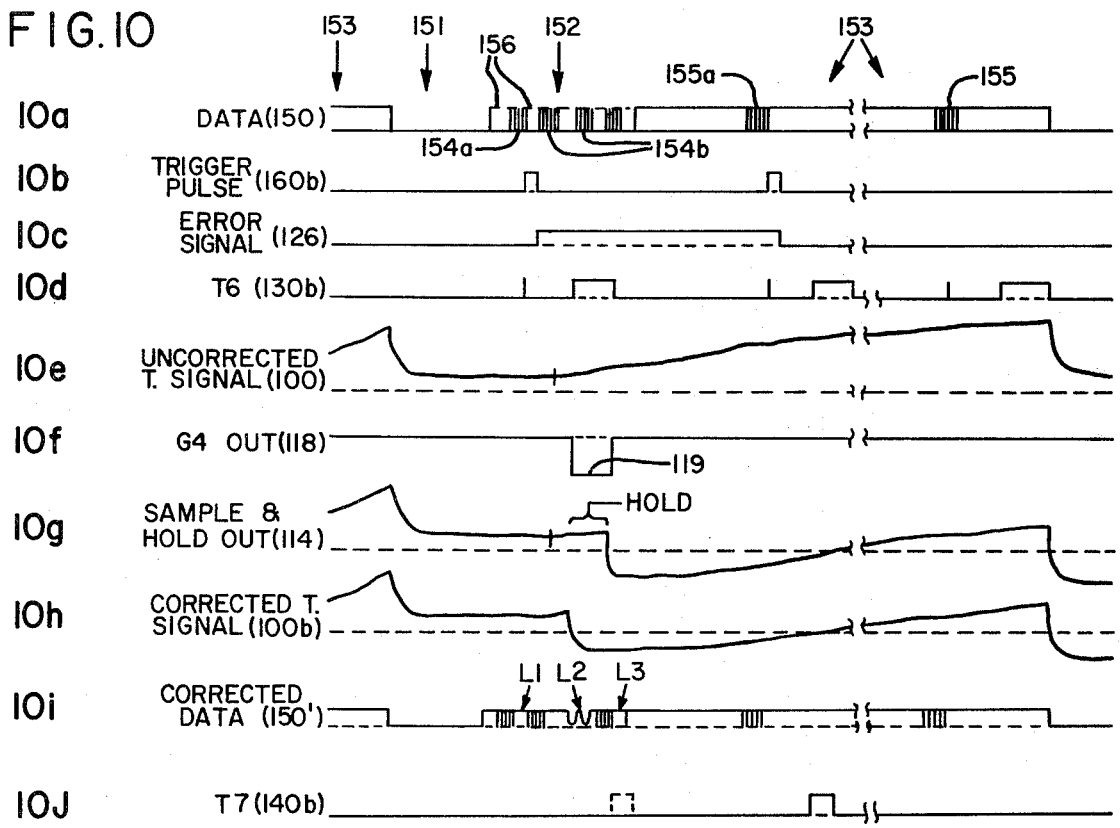
FIG. 10 is a wave form diagram showing the operation of the circuit of FIG. 9.

The circuit of FIG. 9 also includes timing and gating circuits 60b and 70b which operate in the manner described in greater detail below. Referring to FIG. 10, the waveform of FIG. 10a depicts detector output signal 150 in somewhat greater detail than is depicted in FIG. 6a. There are the same general divisions of such signal into a blank section 151 followed by a "leader" data 152, and "live" data 153. In addition, address segments 154 and 155 are depicted as intervals in the "leader" and "live" portions, respectively, by series of vertical lines. Such addresses are contained in the track segments or lines L of the optical record 10 (FIGS. 3, 4). They are modulated onto light beam 46 and detected by detector 14 to produce integral parts of output signal 150.

When scanning of a first track segment is completed, there is a brief interval before the next segment is scanned during which no data is modulated onto light beam 46 for detection by detector 14. This causes the blank section 151 in FIG. 10a to appear at a detector output 150. The logic and decode circuit 95 interprets the blank as an end-of-data signal (EOD) which is transmitted on output 160b to a utilization device, such as a computer 200, or a clock (not shown), or to the timing circuit 70 of FIG. 5.

During the time interval of blank section 151, the scanning light beam 18 is positioned in the "Y" direction by deflector 48 in preparation for scanning the next track segment. As previously discussed, the FIG. 5 and FIG. 7 Embodiments can participate in such positioning by centering beam 18 on the next track segment. In addition, the FIG. 9 Embodiment participates by prepositioning beam 18 to scan a selected track, as described hereinafter under heading "B. Computer-Requested Track Jump Operation". The beam having been prepositioned to scan a track, it now remains to be determined whether it is the correct track.

A. Address Error Correction Operation

When beam 18 impinges on the record 10 the detector 14 resumes receiving data, as reflected by its signal output 150. Circuit 95 accordingly generates a start-of-data (SOD) signal at the beginning of the live data portion 153 for output 160a to a computer 200 or clock (not shown).

The first data received is leader data 152 containing alternating idle data segments 156 and address segments 154. The idle data includes clock synchronization data and address flags for indicating to the logic and decode circuit 95 that an address segment 154 is next in the data stream. If beam 18 has been centered accurately enough on track segment L for the data to be reliably decoded, then circuit 95 will validate and decode such data and serially output address 154a to shift register 86. If beam 18 is not centered closely enough to yield valid data immediately, then element 95 will wait until valid data 154 is received. Valid data will be received as soon as the track follower 50 locks on to the new track segment. Thereafter, a valid address 154b is decoded by circuit 95 and transmitted to shift register 86 as described above.

When the last bit of address 154a is clocked out, decode circuit 95 generates a trigger pulse on output 160b (FIG. 10b). The trigger pulse is transmitted through OR gates 202 and 204 and causes comparator 96 to compare the address 154a in shift register 86 with the desired address in shift register 85. It simultaneously starts delay 75 in timing circuit 70b. Delay 75, in turn, triggers one-shot 76, whose output 130b is timing signal T6, shown in FIG. 10d.

Comparator 96 produces two output signals 125 and 126. Signal 125 is the difference, in parallel digital form, between the addresses in shift registers 85 and 86. If the addresses match, then signal 125 is a logical zero. Signal 125 is the input to the digital-to-analog converter 97. There it is converted to an analog output signal 120b, which is scaled to correspond to the amount that light beam 18 must be deflected in the "Y" direction to intercept the desired track. Output 126 transmits an error signal as shown in FIG. 10c. It indicates whether the addresses match (logical zero) or differ (logical one), and controls gating and timing as follows.

Signal T6 and error signal 126 are the inputs to a logical AND gate 66, whose output 130b' controls a fourth gate 63b (FIG. 9). When both timing signal T6 and error signal 126 are present, AND gate 66 switches fourth gate 63b ON, transmitting converter output 120b to summing amplifier 65 as correction signal 118. Simultaneously, AND gate 66 and inverter 62 cause sample and hold circuit 68, described hereinafter, to hold the present value of the track follower signal 110 as a D.C. sample voltage on output 114 to the summing amplifier. Output signals 114 and 118 are then algebraically summed together by the summing amplifier 65 to form output signal 100b.

Figure 11:
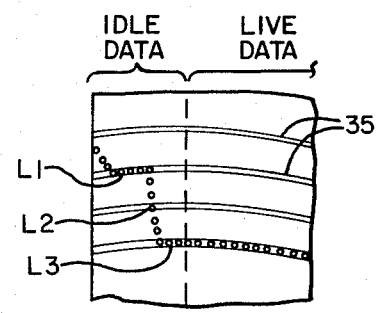
FIG. 11 is an enlarged plan view of a portion of an optical data record showing an example of the scanning path traced by the scanning light beam when it is deflected in the Y direction by the circuitry of FIG. 9.

This operation is illustrated in FIGS. 10e–10h and FIG. 11. FIG. 10e shows the uncorrected track signal 100 of FIGS. 5 and 6 for comparison. In FIG. 11 an address comparison has occurred and the light beam was found to be scanning a wrong track segment L1—two tracks above the desired segment L3. Therefore, light beam 18 was deflected downward two lines. To accomplish such deflection, comparator 96, D/A converter 97 and gate 63b cooperate to produce a correction signal 118 of FIG. 10f. Meanwhile, sample and hold circuit 68 holds the instantaneous track follower signal, as shown in FIG. 10g. Thus, the outputs 114 and 118 are summed to produce a corrected track signal at the output 100b of amplifier 65, as shown in FIG. 10h.

The corrected track signal, applied to the deflector 48, causes the scanning light beam 18 to be deflected in the "Y" direction while the beam continues to be scanned in the "X" direction and to be modulated by the record. Referring to FIG. 11, beam 18 leaves the present track segment L1, moving across the intermediate segment L2 to the desired segment L3, and crossing the spaces separating such tracks. Thus, the beam modulation alternately rises and falls until the beam intercepts the desired track. The light detector output signal 150' likewise rises and falls as shown at label L1 in FIG. 10*i*.

Track follower 50 tries to "lock on" to each segment crossed by the beam, but the track follower output 110 is blocked by sample and hold circuit 68 during the slewing interval. Thus, although the track follower is briefly "confused" while the beam is being slewed, it cannot affect such slewing. Then, when the light beam stops at the desired track line L3, the track follower locks on preparatory to resuming control of deflector 18.

Next, timing signal T6 switches OFF, causing the fourth gate 63*b* to cease conducting and causing circuit 68 to resume conducting the track follower output signal 110. Meanwhile the logic and decode circuit 95 of FIG. 9 receives data from the new track segment L3. If the system restabilizes soon enough, element 95 may receive another address 154*b* from the leader portion 152 of the data signal of FIG. 10*a* and perform a second address comparison immediately. Otherwise, it will wait until the next address, which is address 155*a* contained within the live data 153.

When circuit 95 decodes address 155*a*, it transmits such address to shift register 86, updating the contents thereof with a new "present address". Circuit 95 also sends a trigger pulse via output 160*b* to the comparator 96 and timing circuit 70*b*, triggering a second comparison. If the beam is again found to be scanning the wrong segment, the comparator will produce signals on outputs 125 and 126, as described previously, causing the deflector to slew the beam to yet another segment. This process is repeated until the desired and present addresses match.

When such addresses match, the comparator error signal on output 126 switches to logical zero, as illustrated by the downward going trailing edge in FIG. 10*c*. This action prevents AND gate 66 from turning the fourth gate 63*b* ON and sample and hold circuit 68 OFF when timing signal T6 is produced by one-shot 76. It simultaneously enables AND gate 77 so that timing signal T6 passes through inverter 78 and causes one-shot 79 to produce timing signal T7 (FIG. 10*j*).

Signal T7, in turn, enables a load-address circuit 87 to load the next address into register 85. Loading circuit 87 includes a shift register and gating circuitry of well-known design for interfacing off-line memory devices with a digital computer. When signal T7 is received, the gating circuitry enables the shift register so that the computer 200 can provide a next address at output 180, thereby requesting the information at that address on demand. When such an address is received, the gates of loading circuit 87 can accept a new address from a utilization device, such as a computer 200, and jump to a new track, as described next.

B. Computer-Requested Track Jump Operation

When an optical playback unit is used as a peripheral memory device for a computer, it must be capable of responding on demand to requests for information from the computer. In the previous subsection it was assumed that such a request had already been made. This subsection describes how such requests are fulfilled in an optical playback unit employing the present invention.

When computer 200 of FIG. 9 requires data from a peripheral memory device it sends an address signal on output lines 180 via its peripheral interface bus. The address signal typically includes two parts: an identifier for the selected memory device and the next address sought within that device. The computer also transmits a request signal on output 182.

When the address signal contains an identifier corresponding to the optical playback unit, loading circuit 87 recognizes such identifier and loads the next desired address into shift register 85 via output 181. At the same time, request signal 182 is transmitted through an OR gate 202 to timing circuit 70*b*. There it triggers delay 75 and, in turn, timing signal T6. Similarly, the request signal is transmitted through another OR gate 204 to trigger comparator 96. Once the next address has been loaded into the desired address register 85 as the new desired address, it is compared to the present track address contained in shift register 86 to produce output signals 125 and 126.

The remainder of the operation is essentially identical to the error correction operation described in the previous subsection. In general, output signal 125 is gated through gate 63*b* and summing amplifier 65 to the deflector 48 to cause beam 18 to jump to the new desired track if the desired address is in a different track from that presently being scanned. Thereafter, the error correction operation described previously is performed to insure that the correct track has been accessed.

There are practical limits on the distance that beam 18 can be deflected in the "Y" direction to jump to a new track. When access is desired to portions of the record beyond the beam deflector's range of deflection, it is necessary to move the record 10 in the "Y" direction. Such movement is accomplished by motor 32 driven by digital-to-analog converter output 120*c* through a fifth gate 67 in FIG. 9. Converter 97 divides the comparator output signal 125, which is conducted in parallel binary digits, into two groups—most significant and least significant digits. Each group is converted to an analog signal. The signal corresponding to the most significant digits, output 120*c* to motor 32 via gate 67, causes the gross relative motion between the record and the scanner. The group of least significant digits provides the signal of the output 120*b* through gate 63 to the beam deflector 48 for performing the high speed, beam-positioning operation previously described.

2. Sequential or "Television" Mode.

In general, the operations performed by the circuit of FIG. 9, when the playback device is used in the sequential mode, are the same as when it is used in the random access mode. However, a different arrangement of data and addresses in the optical record is employed, and the record is moved continuously in one direction 41 of FIG. 1, rather than randomly in either direction, by motor 32. Accordingly, there are several differences in the operation of the circuit of FIG. 9 and in the way addresses are formatted on record 10.

Because the data in an optical record is to be recorded and played back sequentially, it is unnecessary to have addresses 155 of FIG. 10*a* within the live data of each track. Any sequential scanning errors in the "Y" direction will be small—one or two tracks—and are reliably corrected during a first address comparison using addresses 154. Therefore, addresses 155 are omitted when the optical recording and playback system is used for television. In addition, shorter addresses can be used than is possible if the system is used as a random access memory device.

Since a comparison of addresses only occurs at the beginning of a scan and since any correction will be highly reliable, the timing circuit 70*b* can be simplified over that which is employed for random accessing. Signal T6 output from one-shot 76 can be input directly into one-shot 79 via correction 131 (dashed line), bypassing AND gate 77 and inverter 78. Consequently, timing signal T7 will occur earlier in each scan, shown in phantom lines in FIG. 10j.

Each track segment is scanned sequentially. Accordingly, the address of each successive segment is simply the address of the previous segment incremented by one. Since no addressing interface circuitry is required for sequential scanning, the loading circuit 87 is replaced by a binary counter (not shown) which are likewise well-known. The address contained in the counter is therefore incremented by signal T7 after each address comparison to produce the address of the next desired segment. That address is immediately loaded into desired address register 85 to await comparison with the address of the next track segment to be scanned.

In sequential operation, such as for use in a television playback unit, carriage 44, containing a record 10 having a television program sequentially recorded thereon, is initially positioned by operation of motor 32 (FIG. 1). The counter of block 87 is reset to address ZERO, corresponding to the first track segment. Then scanning begins. Several track segments at the beginning of the record contain idle data to allow the unit time to stabilize prior to scanning the stored television program.

The first scan will probably not be of the desired ZERO track segment. It could be a scan of either the unrecorded area just above the ZERO segment or a segment just below it. If the first scan is in the unrecorded portion of the record, no data is detected so the circuit of FIG. 9 does nothing. Motor 32 moves the record in the direction of arrow 41 and the scanning operation is repeated until a track segment is detected.

In either case, when an address 154 is detected in the leader 152 of the first segment scanned, it is compared to the desired address (ZERO) in the manner previously described. If an error is detected, signals 125 and 126 are produced causing the light beam to be deflected to the ZERO segment. Whether there is an error or not the counter of block 87 is incremented and the next address (ONE) is loaded into shift register 85.

The light beam proceeds to scan track ZERO, but no further addresses are read and compared since addresses 155 are omitted from the track segments. Therefore, referring to FIG. 10b and 10d, no timing signals are produced to correspond to address blocks 155. If comparator 96 detects an error in address, it produces an error signal on output 126 in the manner previously described, which signal remains ON throughout the present scan. The error signal only turns OFF when a comparison occurs in the next scan and there is no error. Thus, the error signal has sufficiently long duration that it can be applied to an external indicator, such as a lamp (not shown), for indicating to the operator when the playback unit has stabilized.

FIG. 12 Embodiment

The purpose of the FIG. 12 embodiment is to combine the circuits described in the embodiments of FIGS. 5, 7 and 9 so that the operation of each circuit is available during each scan to orient the scanning light beam according to multiple independent variables, namely record misalignment, optical misalignment and address errors or jumps.

In FIG. 12 the control circuit portions 52, 52a and 52b of each of the devices of FIGS. 5, 7 and 9 are outlined in phantom lines. In general, each such block produces an intermediate adjust signal output 120 and a timing signal output 130, which signals are produced in the manner described in the discussion of the FIGS. 5, 7 and 9 Embodiments. Each intermediate adjust signal 120 is applied to its respective gate 63, 63a and 63b, which gates are controlled by their respective timing signals T1, T4 and T6 (FIG. 13a, 13c). The gate outputs 112, 116 and 118, and output 114 from circuit 68 are added together by the summing amplifier 65 to produce a composite tracking signal on output 100d, like that shown in FIG. 13d.

Gate 61, which is the sampling gate of circuit 68, is also controlled by timing signal outputs T1, T4 and T6 so that gate 1 is OFF whenever any of gates 68 are ON. Such control of gate 61 is accomplished by two logical OR gates 136, 137. The timing signals T1 and T4 are fed to OR gate 136 to produce an output which is fed to the next OR gate 137 along with outputs 130b' from AND gate 66. The output of OR gate 137 is inverted by inverter 62, whose output controls gate 61. Thus, gate 61 transmits the track follower output 110 to amplifiers 64, 65 so that the track follower signal controls deflector 48 whenever all the timing signals are OFF. However, when any one of the timing signals is ON, track follower output 110 is blocked by gate 61.

Between gate 61 and amplifier 64 is a capacitor 69 connected to ground, which performs two functions. First it functions as a filter for reducing high frequency switching noise on the signal through gate 61. Second, it operates together with gate 61 and amplifier 64 as a sample and hold circuit 68, like circuit 81 of FIG. 5. While gate 61 is ON the voltage across the capacitor 69 follows (samples) the track follower signal on output 110. When gate 61 turns OFF in response to any one of the timing signals, the capacitor voltage is held at the last gated instantaneous value of the track follower signal 110. This capacitor voltage drives the high impedance-input buffer amplifier 64 so as to provide a constant-level signal to summing amplifier 65 while gate 61 is OFF.

However, it is only desired to hold the instantaneous value of the track follower signal when it is interrupted during a scan, not during the blank interval 151 between scans. Therefore, discharge means are provided for discharging the signal held by the capacitor during such blank intervals. The discharge means comprises a sixth gate 89 in parallel with capacitor 69. The output of OR gate 136 renders gate 89 conducting to discharge capacitor 69. Thus, whenever the timing signal of either output 130 or 130a comes ON (which only occurs during blank interval 151), gate 89 discharges capacitor 69. Once signals 130a and 130b turn OFF, gate 89 turns OFF enabling capacitor 69 to charge. Gate 61 is simultaneously turned ON by the output signal from inverter 62, once again allowing the signal on output 110 to pass. Consequently, the circuit including gates 61 and 89, capacitor 69, and amplifier 64 only acts as a sample and hold device when an address correction alone is made by circuit 52b. During blank intervals 151 it acts essentially as a simple gate, like gate 61 alone, because gate 89 is conducting and prevents capacitor 69 from charging.

Combining the embodiments of FIGS. 5 and 9 makes it necessary to compensate, in the FIG. 5 circuit 52, for track changes during a scan caused by the FIG. 9 circuit 52b. Referring to FIG. 13d, when a new scan is initiated, the sample and hold circuit 81 samples value 111b of signal 110 soon after the track follower stabilized and stores that value for restoring the beam to a corresponding position preparatory to the next scan. But if circuit 52b causes the beam to jump to another track during a scan, then it renders the value 111b stored in circuit 81 obsolete unless the jump is compensated for.

Therefore, another sample and hold circuit 88 is provided in FIG. 12 for storing the intermediate adjustment signal of output 120b when such signal is gated through the fourth gate 63b. Circuit 88 is like circuit 68. Timing signal output 130b' controls the sampling gate 101 circuit 88 so that the circuit samples the output 118 while gate 63b is ON, and holds value 119 (FIG. 10f) in capacitor 102 when gate 63b turns OFF. The capacitor voltage drive buffer amplifier 103 produces a sample output signal 128. Signal 128 is added to the output signal 120 of circuit 81 by a summing amplifier 99, whose output provides an augmented sample and hold signal 129 to gate 63.

Continuing the example of circuit operation discussed in the FIG. 9 Embodiment, the augmented sample and hold signal 129 is illustrated in FIG. 13e. It can be seen that circuit 81 samples the track follower signal on output 110 during the time interval in which timing signal T2 is ON and then holds the value 111b of that signal. When timing signal T6 switches ON after an address error is detected, the fourth gate 63b turns ON and circuit 88 samples and holds its output signal 128 at level 119 (FIG. 10f). Signal 120 (value 111b in FIG. 13e) and signal 128 (value 119 in FIG. 10f) are algebraically summed by amplifier 99 causing the agumented sample and hold output signal 129 to drop to value 111b', in FIG. 13e. Thus, when the next segment is scanned, signal 129 will compensate for address error corrections made during the present scan, so that the light beam will properly intercept to next track segment.

Having illustrated and described the principles of my invention from what are presently preferred embodiments, it should be apparent to those skilled in the art that other modifications and uses can be made of my invention without departing from such principles. I claim as my invention all such modifications as come within the true spirit and scope of the following claims.

I claim:

1. An optical playback apparatus for reading data recorded on an optical data record in a plurality of spaced-apart data track segments, comprising:
   light beam forming means for forming a light beam;
   scanning means for scanning said light beam across said record in a scanning direction from a beginning point to an end point along a scanning path to intermittently scan successive track segments, the beginning and end points of successive segments being different, said path having a width corresponding to the width of said track segments, said scanning means having at least one optical element causing said light beam to move along said scanning path to modulate said light beam in accordance with the optical data on said record;
   light detector means for detecting said modulated light beam and producing an output signal corresponding thereto; and
   track segment intercept means for causing said light beam to intercept a selected one of said track segments at an intercept position to begin scanning said track segment, said intercept means including:
   deflection means between said beam forming means and said record for deflecting said light beam transversely to the scanning direction;
   storage means for storing a discrete element of information corresponding to an amount by which said scanning light beam must be deflected transversely of said scanning path to intercept said selected track segment near the beginning point thereof, said amount including a non-integer multiple of the transverse spacing of the track segments;
   adjust means for producing an adjustment signal corresponding to said stored information and briefly applying said signal to said deflection means to cause it to deflect said light beam transversely by said amount to said intercept position so that said light beam intercepts said selected track segment near its beginning point preparatory to the scanning of said selected segment.

2. Playback apparatus according to claim 1 wherein:
   the transverse orientation of said light beam with respect to said track segments is a function of two independent variables, at least one of said variables defining said non-integer multiple of said spacing;
   said storage means includes two storage portions, each storage portion being adapted to storage of information relating to one of said variables;
   said adjust means includes two adjustment portions, each adjustment portion being connected to one of said storage portions for producing an intermediate adjustment signal corresponding to the information contained in said one storage portion, and
   summing means for algebraically summing said intermediate adjustment signals together to form the adjustment signal.

3. Playback apparatus according to claim 2 wherein one of said storage portions comprises an optical alignment storage portion for storing information about the optical alignment of an optical element in said scanning means such that the adjustment portion connected thereto produces an intermediate adjustment signal to compensate for any optical misalignment of said element from a reference axis, the amount of said misalignment being said non-integer multiple of said spacing and the compensating intermediate adjustment signal being proportional to said misalignment.

4. Playback apparatus according to claim 2 including:
   track-following means for receiving said detector output signal while said record is being scanned and producing a tracking signal when said scanning path is out of alignment with the center line of a track segment; and
   gating means responsive to said detector output signal for alternately gating said adjustment signal and said tracking signal to said deflection means during each scan, so that said deflection means is alternately responsive to said tracking signal to keep said light beam aligned with a track segment as it is being scanned and is selectively responsive to said adjustment signal to reposition said beam to intercept said selected track segment following an interruption of said detector output signal;
   one of said storage portions comprising a tracking signal storage portion for storing a sampled value of said tracking signal during the scanning of each track segment so that the adjustment portion connected thereto produces an intermediate adjustment signal for gating to the deflector means to shift the light beam by said non-integer multiple of track spacing following the scanning of said track segment.

5. Playback apparatus according to claim 4 wherein said storage means further includes an address storage portion for storing track segment-identifying information and two of said tracking signal storage portions including:
   a first tracking signal storage portion for sampling a first said sampled value near the beginning of the scan of one track segment and for holding said first value for the duration of said scan;
   a second tracking signal storage portion for sampling a second said sampled value and gating a signal corresponding to said value to said deflection means while said light beam is being repositioned to intercept a selected second track segment;
   said sampled values each being proportional to non-integer multiples of said spacing;
   the adjust means including an address adjustment portion connected to the address storage portion for producing an intermediate address adjustment signal proportional to an integer multiple of the transverse spacing of the track segments.

6. Playback apparatus according to claim 5 including:
   second storage means connected to the address adjust means for receiving and storing said intermediate address adjustment signal;
   second adjust means connected to the second storage means for producing a compensating adjustment signal in accordance with the stored intermediate address adjust signal; and
   second summing means for algebraically summing said compensating adjust signal together with the first sampled value of the tracking signal.

7. An optical playback apparatus for reading data recorded on a non-rotating optical data record in a plurality of spaced apart discontinuous data track segments, comprising:
   light beam forming means for forming a light beam;
   scanning means for scanning said light beam from side to side across said record in a scanning direction along a scanning path of a width corresponding to the width of said track segment, said scanning means having at least one optical element causing said light beam to move along said scanning path to modulate said light beam in accordance with the optical data on said record;
   light detector means for detecting said modulated light beam and producing an output signal corresponding thereto; and
   track segment intercept means for causing said light beam to intercept a selected one of said track segments at an intercept position, said intercept means including:
      deflection means between said beam forming means and said record for deflecting said light beam transversely to the scanning direction;
      storage means for storing information corresponding to an amount by which said scanning light beam must be deflected transversely of said scanning path to intercept said selected track segment, said amount being a non-integer multiple of the spacing of said track segments;
      adjust means for producing an adjustment signal corresponding to said stored information and applying said signal to said deflection means to cause it to deflect said light beam so that said light beam intercepts said selected track segment preparatory to the scanning of said segment;
      timing means responsive to the detector means output signal for producing a timing signal;
      track-following means for receiving the detector output signal while a record is being scanned and producing a tracking signal when said scanning path is out of alignment with the center line of a track segment; and
      gating means responsive to said timing signal for alternately gating said adjustment signal and said tracking signal to said deflection means during each scan so that said deflection means is alternately responsive to said tracking signal and to said adjustment signal;
      said storage and adjust means including a sample and hold means responsive to said timing signal for sampling a value of said tracking signal when said scanning path coincides with a first-scanned track segment and holding said sampled value as an output signal to the gating means to be applied to the deflection means as part of the adjustment signal.

8. Playback apparatus according to claim 7 wherein:
   said storage means stores said value of said tracking signal in response to a first timing signal soon after said detector means begins to receive data recorded in said first-scanned track segment; and
   said timing means produces a second timing signal so that following completion of scanning of said first-scanned track segment:
      said adjustment means produces an adjustment signal corresponding to said stored value of said tracking signal; and
      said gating means causes said deflection means to briefly cease receiving said tracking signal and to receive said adjustment signal;
   whereby said deflection means causes said light beam to be repositioned for the scanning of a second track segment.

9. Playback apparatus according to claim 7 wherein the timing means includes means responsive to a temporary interruption of the light detector means output signal upon completion of scanning of said first-scanned track segment to cause said deflection means to reposition said light beam according to said adjustment signal prior to sampling a second value of said tracking signal for a second track segment.

10. An optical playback apparatus for reading data recorded on a nonrotating optical data record in a plurality of spaced apart data track segments, comprising:
   light beam forming means for forming a light beam;
   scanning means for scanning said light beam across said record in a scanning direction along a scanning path of a width corresponding to the width of said track segment, said scanning means having at least one optical element causing said light beam to move along said scanning path to modulate said light beam in accordance with the optical data on said record;
   light detector means for detecting said modulated light beam and producing an output signal corresponding thereto; and
   track segment intercept means for causing said light beam to intercept a selected one of said track segments at an intercept position, said intercept means including:
   deflection means between said beam forming means and said record for deflecting said light beam transversely to the scanning direction;

storage means for storing information corresponding to an amount by which said scanning light beam must be deflected transversely of said scanning path to intercept said selected track segment;

adjust means for producing an adjustment signal corresponding to said stored information and applying said signal to said deflection means to cause it to deflect said light beam so that said light beam intercepts said selected track segment preparatory to the scanning of said segment;

timing means for producing a timing signal;

gating means responsive to said timing signal for gating said adjustment signal to said deflection means so that said deflection means is selectably responsive to said adjustment signal;

said scanning means including multiple sets of optical elements for successively scanning track segments;

said storage means including means for storing unique information about the optical alignment of each set of optical elements, the optical alignment including an amount of misalignment which is a non-integer multiple of the spacing of said track segments;

said adjust means employing said unique information to produce an adjustment signal to successively adjust the transverse position of said light beam as each set of optical elements begins scanning said record to compensate for said misalignment; and said timing means including means responsive to a transition of scanning from a first set of optical elements to a second set thereof for causing the storage means to output said unique information for said second set to the adjust means to cause generation of said adjustment signal before said second set begins to scan a track segment.

11. Playback apparatus according to claim 10, wherein said scanning means includes mark means for uniquely identifying one of said sets of optical elements and second detector means for detecting said mark means and producing an output signal corresponding thereto.

12. Playback apparatus according to claim 11, wherein said second detector means output signal is input to one of said storage and adjust means and causes said storage and adjust means to produce a selected adjustment signal for positioning said light beam on a track segment preparatory to said identified set of optical elements scanning said light beam across said record.

13. Playback apparatus according to claim 10 wherein said stored information includes a digital signal having an equivalent analog value which is proportional to the amount of transverse misalignment of the scanning light beam relative to a reference position.

14. In an optical playback apparatus for reading data recorded on a non-rotating optical data record in a plurality of spaced-apart data track segments each extending from side to side across the record from a beginning point to an ending point at opposite sides of the record; the playback apparatus including scanning means for scanning a light beam across the record along said tracks to modulate the light beam in accordance with the data recorded thereon and light detector means for detecting the modulated light beam and producing an output signal corresponding thereto, the scanning means including an optical element for transmitting said beam to the record, the playback apparatus being subject to errors in the transverse alignment of the beam with the track segments when the beam is shifted from the end point of one track segment following scanning thereof to the beginning point of the next successive track segment to commence scanning said next segment, said errors including a non-integer-multiple of the center-to-center transverse spacing of the track segments;

track intercept means for positioning the light beam transversely of the track segments to intercept each successive track segment at substantially the beginning point thereof, said track intercept means comprising:

deflection means in the path of said light beam for deflecting the light beam transversely of said track segments;

adjust means for producing an adjustment signal for controlling the deflection means to transversely reposition the light beam a distance from its position at the end point of a first track segment at one side of the record so as to intercept a second track segment at substantially the beginning point thereof on the opposite side of the record and thereby compensate for said alignment errors, said distance including a non-integer multiple of said track spacing;

timing means responsive to a transition from scanning said first segment to the scanning of said second segment for producing a timing signal; and gating means responsive to the timing signal to briefly apply the adjustment signal to the deflection means in time to reposition the beam for scanning a beginning portion of said second track segment.

15. Optical playback apparatus according to claim 14 including at least two of said optical elements, the second element being positioned to scan the light beam along the second track segment following scanning of the light beam along the first track segment by the first element, in which:

the track intercept means includes optical alignment storage means for storing an optical alignment signal corresponding to each of said optical elements and for outputting said alignment signal in response to the timing signal;

the adjust means being connected to the storage means for producing said adjustment signal in accordance with said stored alignment signal upon occurrence of said timing signal.

16. Optical playback apparatus according to claim 14 including a track-following means for providing a tracking signal to the deflection means during the scanning of each of said tracking segments, in which:

the track intercept means includes a tracking signal storage means for sampling and storing a sampled value of the tracking signal during the scanning of each track segment;

the timing means including first timing means for controlling the tracking signal storage portion to sample and store said sampled value during the scanning of a beginning portion of the first track segment and second timing means for controlling the gating means to apply the adjustment signal including said sampled value to the deflection means following completion of scanning of the first track segment.

* * * * *